US008917271B2

United States Patent
Rhoades et al.

(10) Patent No.: US 8,917,271 B2
(45) Date of Patent: Dec. 23, 2014

(54) REDISTRIBUTION OF GENERATED GEOMETRIC PRIMITIVES

(75) Inventors: Johnny S. Rhoades, Durham, NC (US); Ziyad S. Hakura, Gilroy, CA (US); Emmett M. Kilgariff, San Jose, CA (US); Dale L. Kirkland, Madison, AL (US); Cynthia Ann Edgeworth Allison, Madison, AL (US); Karl M. Wurstner, Madison, AL (US); Karim M. Abdalla, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1008 days.

(21) Appl. No.: 12/897,578

(22) Filed: Oct. 4, 2010

(65) Prior Publication Data

US 2011/0080404 A1    Apr. 7, 2011

Related U.S. Application Data

(60) Provisional application No. 61/248,834, filed on Oct. 5, 2009.

(51) Int. Cl.
*G06T 15/50*   (2011.01)
*G06T 17/20*   (2006.01)
*G06T 15/00*   (2011.01)

(52) U.S. Cl.
CPC ............... *G06T 15/005* (2013.01); *G06T 17/20* (2013.01); *G06T 2210/52* (2013.01)
USPC ........................................................ 345/426

(58) Field of Classification Search
None
See application file for complete search history.

(56) References Cited

U.S. PATENT DOCUMENTS

| 2003/0164825 | A1* | 9/2003 | Baldwin et al. | 345/419 |
| 2008/0007559 | A1* | 1/2008 | Kalaiah et al. | 345/501 |
| 2010/0164954 | A1* | 7/2010 | Sathe et al. | 345/423 |
| 2010/0277488 | A1* | 11/2010 | Myers et al. | 345/581 |
| 2010/0328309 | A1* | 12/2010 | Sarel et al. | 345/426 |

* cited by examiner

*Primary Examiner* — Daniel Hajnik
(74) *Attorney, Agent, or Firm* — Patterson & Sheridan LLP.

(57) ABSTRACT

One embodiment of the present invention sets forth a technique for redistributing geometric primitives generated by tessellation and geometry shaders for per-vertex by multiple graphics pipelines. Geometric primitives that are generated in a first processing stage are collected and redistributed more evenly and in smaller batches to the multiple graphics pipelines for vertex processing in a second processing stage. The smaller batches do not exceed the resource limits of a graphics pipeline and the per-vertex processing workloads of the graphics pipelines in the second stage are balanced. Therefore, the performance of the tessellation and geometry shaders is improved.

24 Claims, 10 Drawing Sheets

REDISTRIBUTION OF GENERATED GEOMETRIC PRIMITIVES

CROSS-REFERENCE TO RELATED APPLICATIONS

This application claims priority benefit to United States provisional patent application titled, "TWO STAGE PROCESSING OF INTERNALLY GENERATED GEOMETRIC PRIMITIVES," filed on Oct. 5, 2009 and having Ser. No. 61/248,834.

BACKGROUND OF THE INVENTION

1. Field of the Invention

The present invention generally relates to generation of geometric primitives during tessellation of surfaces, and more specifically to the redistribution of the generated geometric primitives for per-vertex processing.

2. Description of the Related Art

In prior graphics systems, primitives were processed in multiple graphics pipelines concurrently in a single pass. In the single pass scheme, internally generated primitives stayed within the same graphics pipeline all the way up to the rasterization step. Tessellation and geometry shaders can generate a highly variable and potentially large number of primitives, which for example might occur when tessellating a surface into many small primitives with a high level-of-detail (LOD). This expansion of work, if processed in a single stage, can cause serialization of the multiple graphics pipelines due to resource limitations and the serialization reduces the processing performance. Even if resource limitations do not cause serialization, the variable amount of work in different graphics pipelines can reduce performance to that of the slowest graphics pipeline.

Accordingly, what is needed in the art is a system and method for balancing the primitive processing workload generated by tessellation and geometry shaders for processing by multiple graphics pipelines.

SUMMARY OF THE INVENTION

One embodiment of the present invention sets forth a technique for redistributing geometric primitives generated by tessellation and geometry shaders for per-vertex by multiple graphics pipelines. Geometric primitives that are generated in a first processing stage are collected and redistributed more evenly and in smaller batches to the multiple graphics pipelines for vertex processing in a second processing stage. The smaller batches do not exceed the resource limits of a graphics pipeline and the per-vertex processing workloads of the graphics pipelines in the second stage are balanced. Therefore, the performance of the tessellation shader and geometry shaders is improved.

Various embodiments of a method of the invention for distributing generated geometric primitives for processing by streaming multiprocessors includes executing a hull shader program by a first set of the streaming multiprocessors to process surface patches and generate tessellation data for each surface patch including tessellation level-of-detail values that define generated geometric primitives for each surface patch. Tasks are generated for processing the generated geometric primitives based on resource limitations of a streaming multiprocessor configured to execute one of the tasks and the level-of-detail values. The tasks are then distributed to a second set of the streaming multiprocessors to process the tasks according to a domain shader program to produce processed vertices of the surface patches.

Various embodiments of the invention include a system for distributing generated geometric primitives for processing by streaming multiprocessors. The system includes a graphics processor that includes a first set of streaming multiprocessors and a second set of multiprocessors. The first set of multiprocessors are each configured to execute a hull shader program to process surface patches and generate tessellation data for each surface patch including tessellation level-of-detail values that define generated geometric primitives for each surface patch. The first set of streaming multiprocessors generate tasks for processing the generated geometric primitives based on resource limitations of a streaming multiprocessor configured to execute one of the tasks and the level-of-detail values. The second set of the streaming multiprocessors are coupled to the first set of streaming multiprocessors through a crossbar interconnect and are configured to process the tasks according to a domain shader program to produce processed vertices of the surface patches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
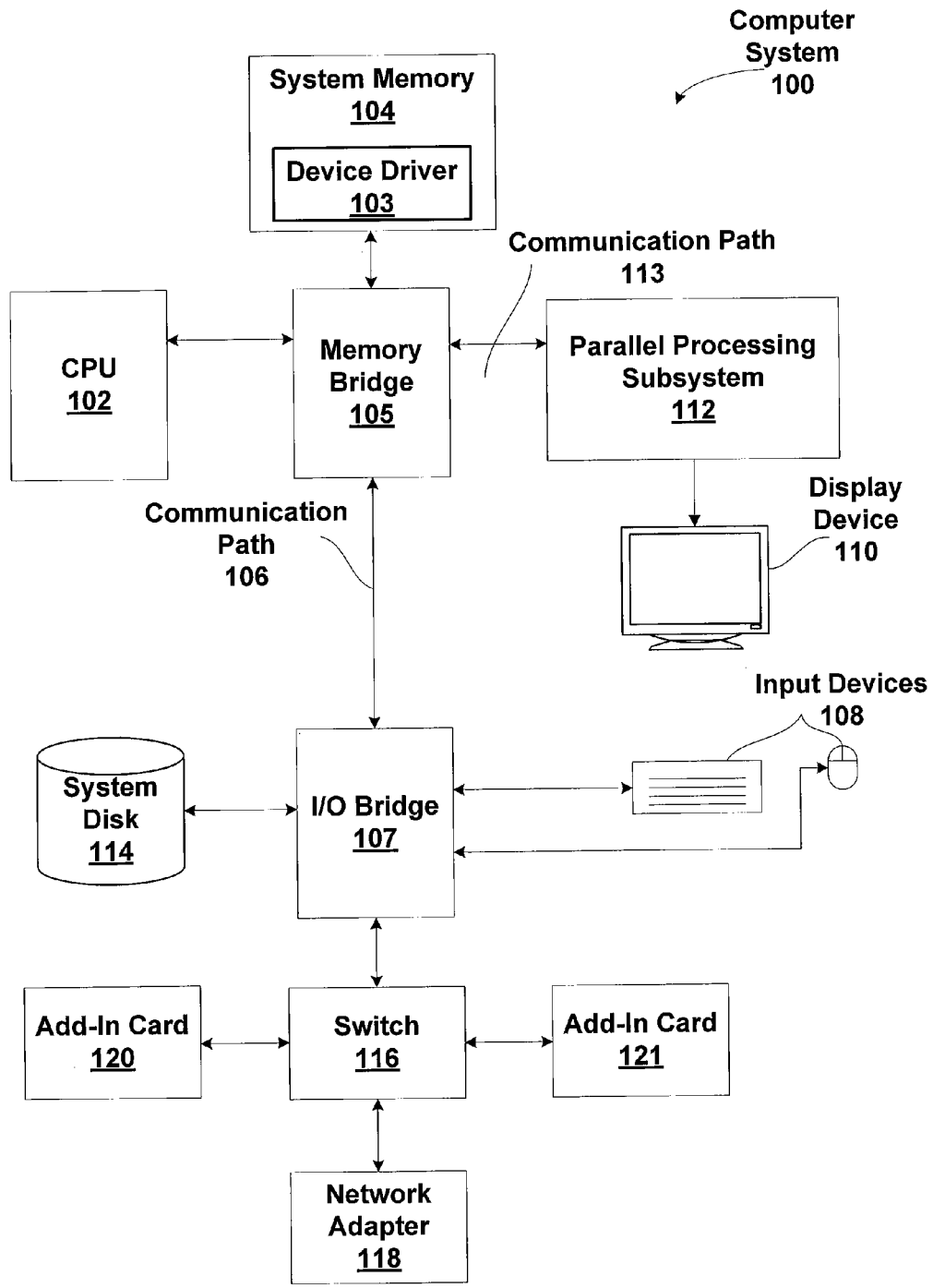
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
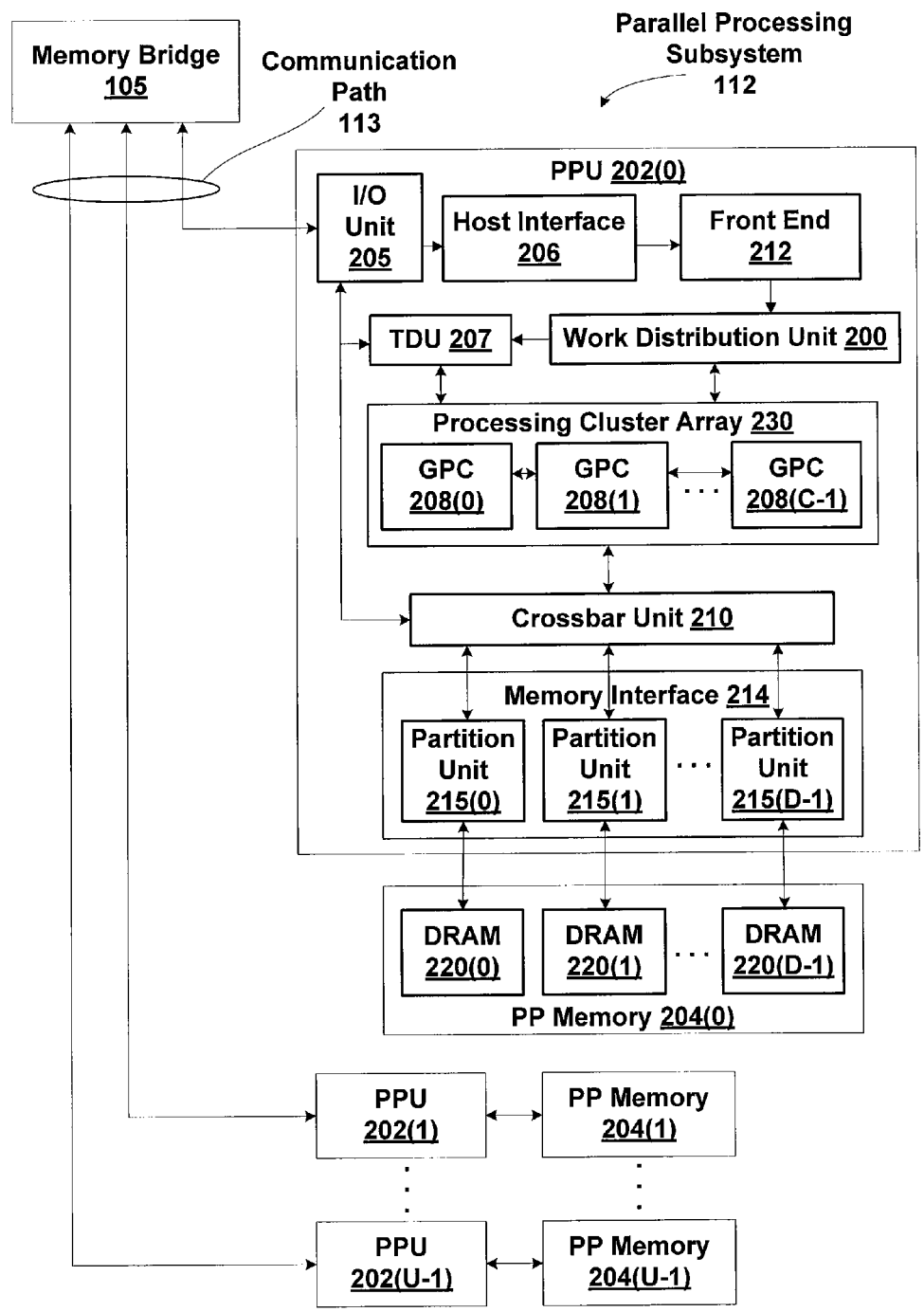
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive batches of surfaces to be executed via a work distribution unit 200, which receives commands defining processing batches from front end unit 212. Processing batches include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the batches, or work distribution unit 200 may receive the indices from front end 212. Front end 212 ensures that GPCs 208 are configured to a valid state before the processing specified by the pushbuffers is initiated. The batches are processed by the GPCs 208 to produce tasks of tessellated vertices. A task distribution unit (TDU) 207 in each GPC 208 receives the tasks and distributes the tasks to GPCs 208 for processing.

When PPU 202 is used for graphics processing, for example, the processing workload for each patch is divided into approximately equal sized tasks to enable distribution of the tessellation processing to multiple GPCs 208. The work distribution unit 200 may be configured to produce batches at a frequency capable of providing batches to multiple GPCs 208 for processing and the TDU 207 may be configured to output tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
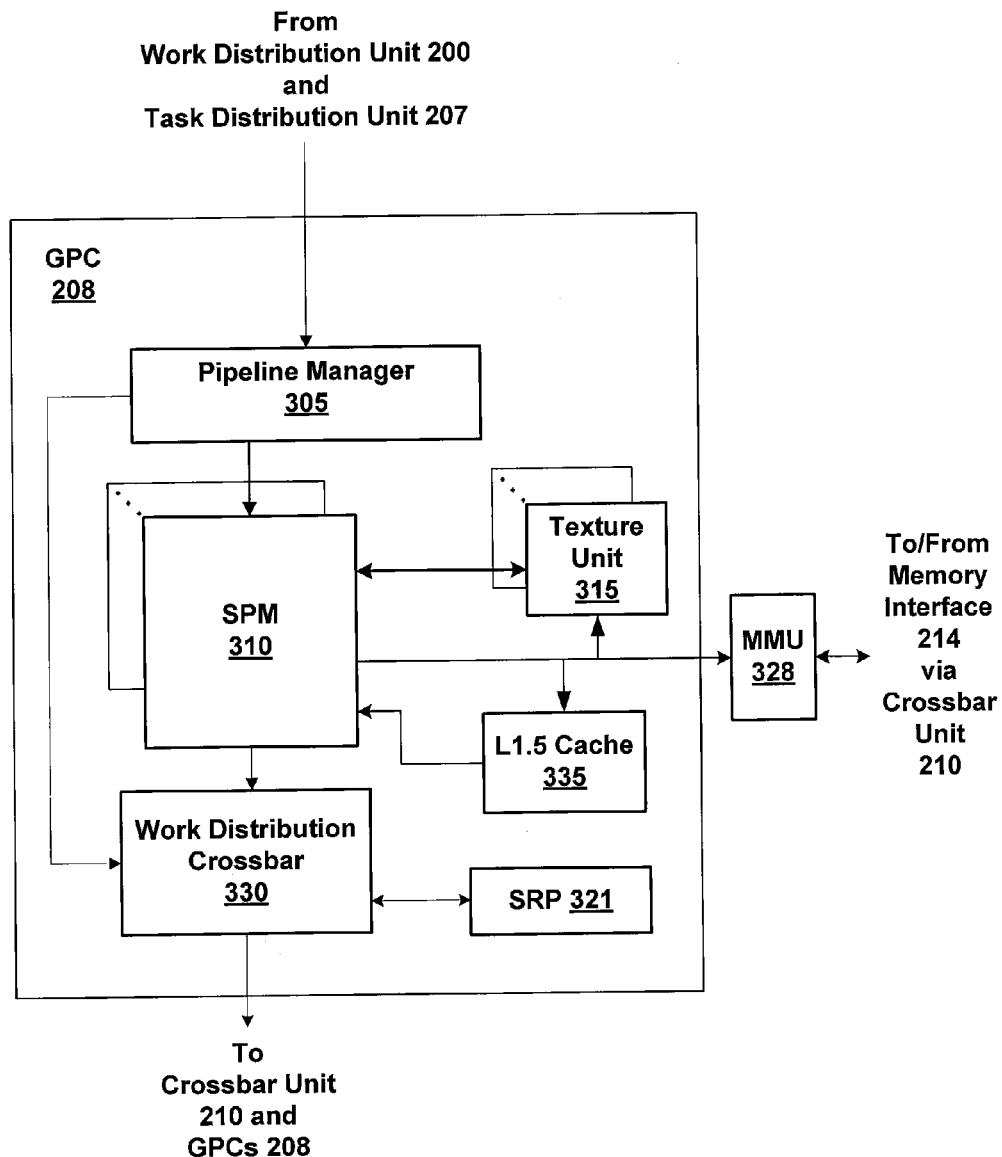
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A setup, rasterization, and preROP (pre-raster operations) unit SRP 321 is configured to receive data from an SPM 310 via the work distribution crossbar 330, perform primitive setup operations, rasterization, perform optimizations for color blending, organize pixel color data, and perform address translations.

It will be appreciated that the core architecture described herein is illustrative and that variations and modifications are possible. Any number of processing units, e.g., SPMs 310 or texture units 315, SRPs 321 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
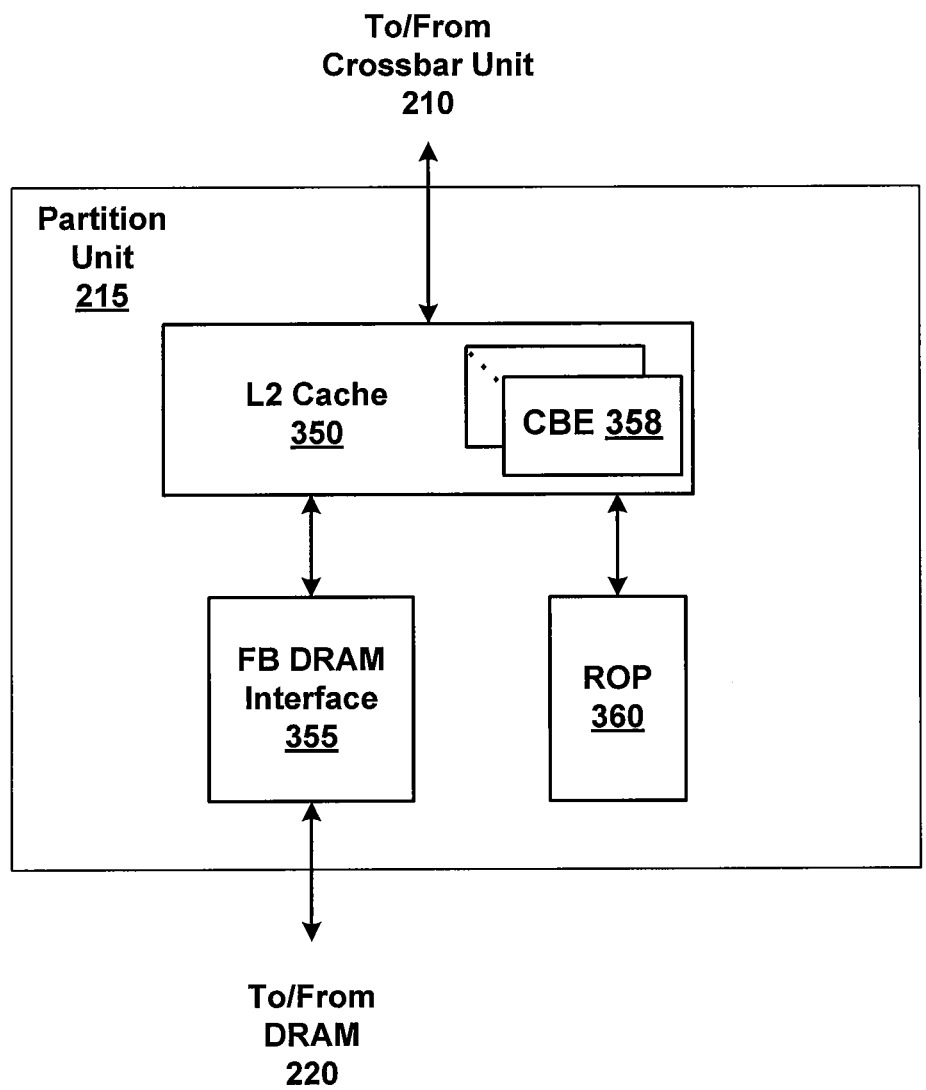
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

The L2 cache 350 may store entries of circular buffers, circular buffer entries (CBE) 358 are First-In-Random-Out (FIRO) buffers that are configured to store geometric primitive attribute data, constants and state information, and the like. A CB manager allocates the CBE 358 to reside in the system shared L2 cache 350, although the L2 cache 350 may flush the CBE 358 to backing store if necessary. Normally CBEs 358 are assigned a high stickiness value in the L2 cache 350. More specifically, CBEs 358 are typically marked "evict last," which means CBE 358 will not be evicted from the cache until there is no lower priority data available for eviction. Requests are issued to the CB manager when a CBE is needed to store primitive attribute data for a batch of primitives received from the primitive distribution unit 200.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
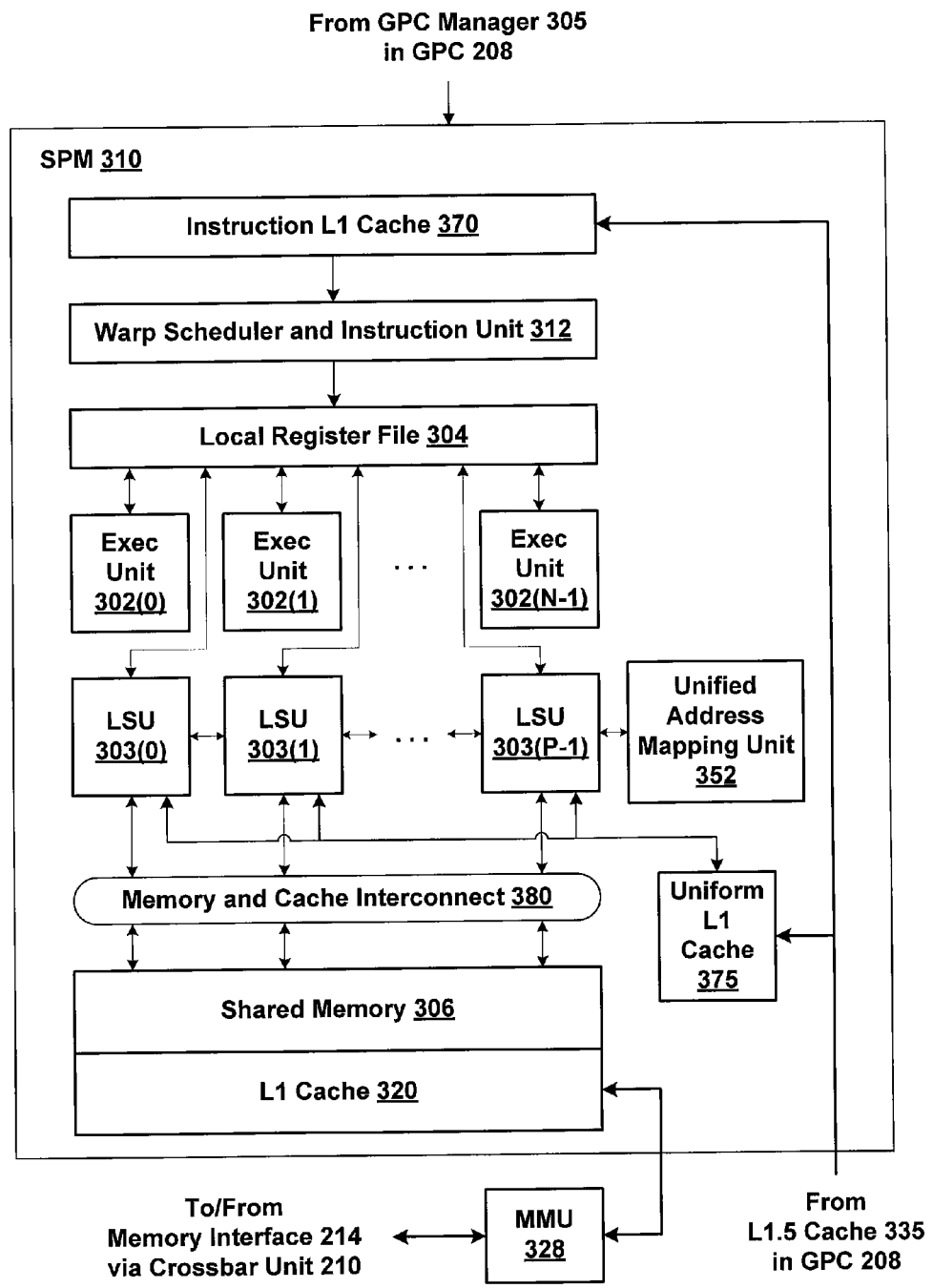
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CIA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CIA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
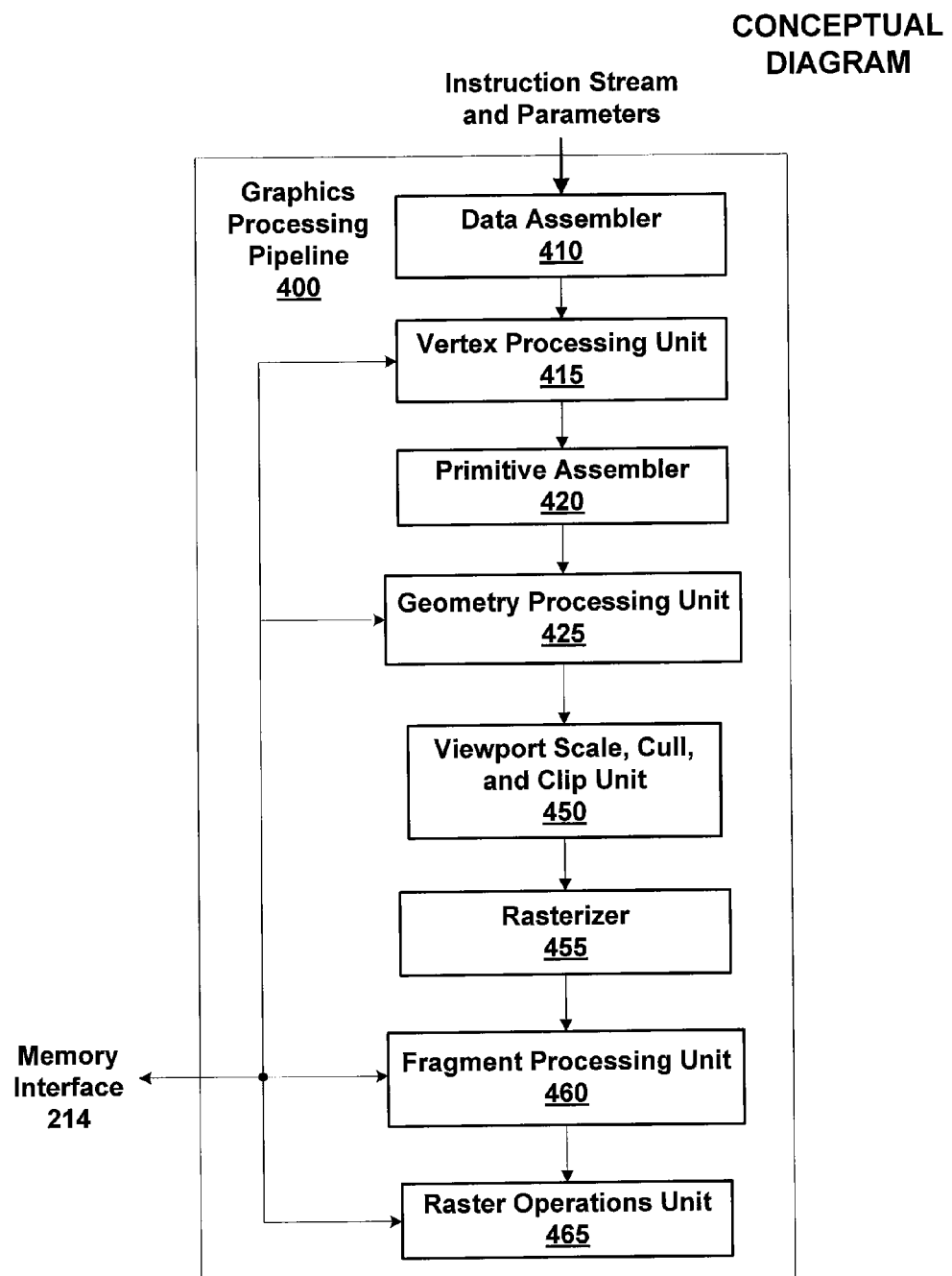
FIG. 4 is a conceptual diagram of a graphics processing pipeline that one or more of the PPUs of FIG. 2 can be configured to implement, according to one embodiment of the present invention

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Although the method steps are described in conjunction with the systems of FIGS. 1, 2, 3A, 3B, and 3C, persons skilled in the art will understand that any system configured to perform the method steps, in any order, is within the scope of the inventions.

Redistribution of Generated Geometric Primitives

Figure 5A:
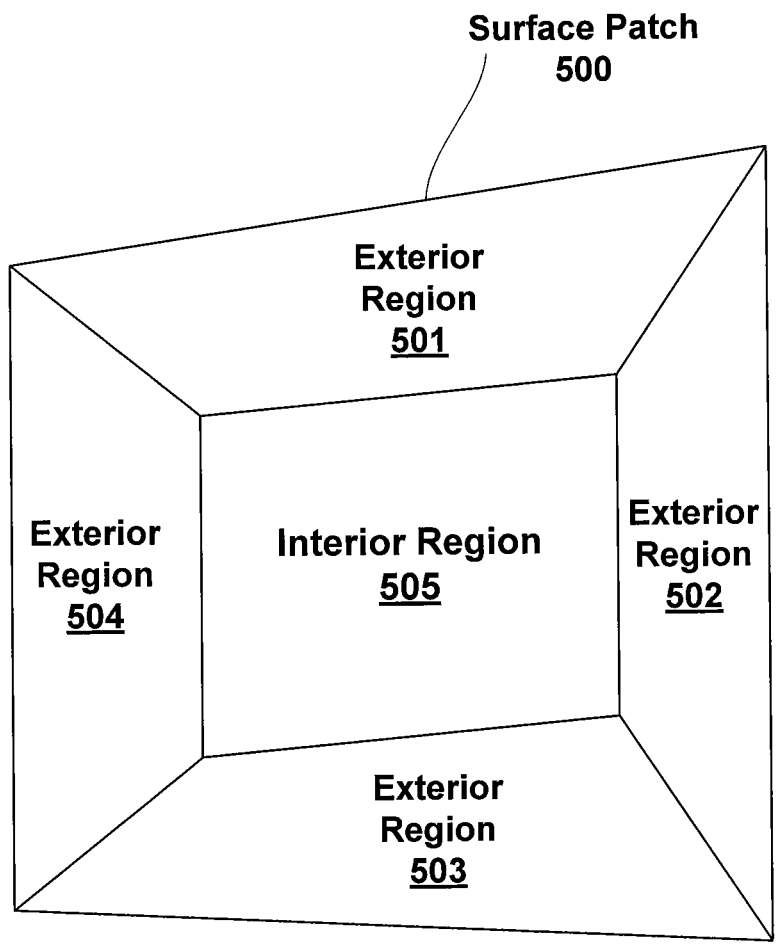
FIG. 5A is a diagram of a surface patch that is processed by a hull shader to produce multiple geometric primitives, according to one embodiment of the invention.

FIG. 5A is a diagram of a surface 500 that is processed by a hull shader to produce multiple geometric primitives, according to one embodiment of the invention. The output of hull shader is a set of level-of-detail (LOD) values for the surface 500 that specify the number of geometric primitives that are produced by a domain shader when the surface 500 is tessellated. The surface 500 may be divided into several exterior regions 501, 502, 503, and 504 and an interior region 505 that are associated with different LOD values. In particular, an LOD value may be specified for the interior region 505 and different LOD values may be specified for each one of the exterior regions or outside edges of the exterior regions. As the LOD values increase, more vertices are produced by the hull shader to generate more geometric primitives.

A single surface patch 500 may be processed by a SPM 303 executing a hull shader to produce a number of vertices that exceeds the resource limit of the SPM 310. To complete tessellation of the surface patch 500 a domain shader is executed for each tessellated vertex. Specifically, a processing thread is executed for each vertex and the number of attributes for each vertex of the tessellated surface patch 500 may exceed the storage capacity of a single SPM 310. When the resources are exceeded, execution of the domain shader to process the vertices is serialized. Serialization may be avoided by redistributing the generated geometric primitives (vertices) for processing by multiple SPMs 310.

Tessellation and geometry shaders are the types of shaders that may generate primitives when executed by the SPMs 310. In order to balance the increased processing loads when surface patches are expanded into different quantities of geometric primitives by the hull shaders, the SPMs 310 are partitioned into two disjoint sets called Alpha and Beta. In partitioned mode, stage 1, called the Alpha stage, processing is performed by SPMs 310 in the Alpha set. The Alpha SPMs 310 process batches of one or more surface patches to generate work units called tasks, which are forwarded to a collector block. The tasks describe a limited number of geometric primitives that can be processed later by stage 2, called the Beta stage, without exceeding resource limits and thus causing stalls and serialization. The tasks are distributed to the Beta stage SPMs 310 where the tasks are collected and processed. The collected tasks may be reordered in API order (the order that the application presented the surfaces for processing) prior to being processed by the Beta stage SPMs 310. Geometric primitives processed by the Beta stage are forwarded to the rasterizers. The two processing stages operate concurrently but in different SPMs 310.

In order to perform tessellation in a single pass, the alpha stage SPMs 310 are configured to execute vertex shaders and tessellation control shader programs, e.g., hull shaders, and the beta stage SPMs 310 are configured to execute tessellation evaluation shader programs and geometry shader programs, e.g., domain shaders. An application program or device driver 103 provides surface patch descriptions. The alpha stage SPMs 310 receive surface patch descriptions and generate geometric primitives, such as cubic triangle primitives defined by ten control points, and tessellation parameters such as LOD values. Geometric primitives and tessellation parameters are routed from the alpha stage SPMs 310 to the beta stage SPMs 310 through alpha circular buffers (stored in CBEs 358) in the L2 cache 350 and work distribution crossbar 330.

The number of SPMs 310 in the alpha stage may be equal, greater than, or less than the number of SPMs 310 in the beta stage. Importantly, the number of SPMs 310 in the alpha and beta stages can be tailored to match the processing workload. The number of vertices produced by a single surface patch varies with the computed tessellation level of detail. Therefore, a single SPM 310 in the alpha stage may produce "work" for multiple SPMs 310 in the beta stage since execution of a tessellation control shader program may result in a data expansion.

Figure 5B:
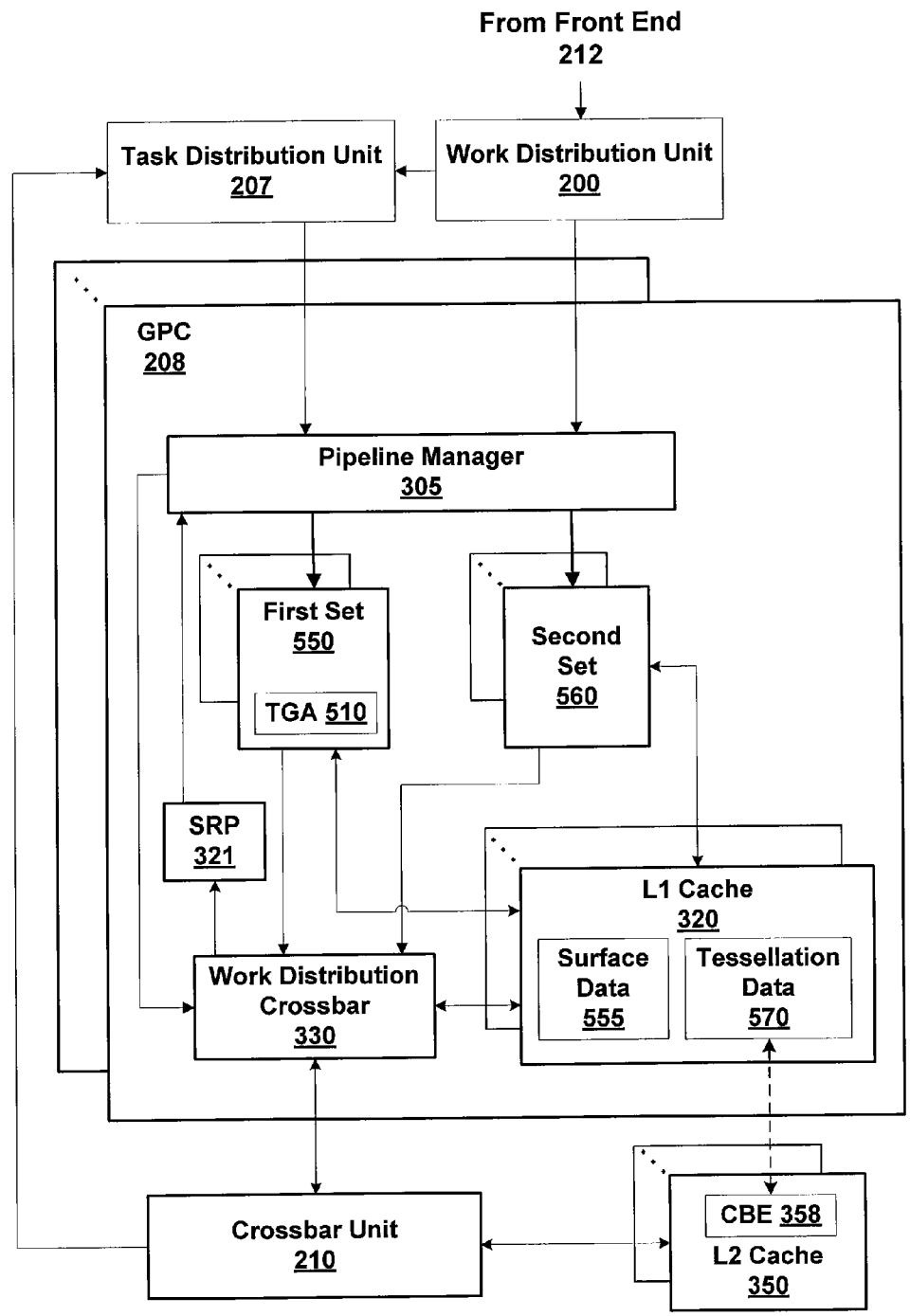
FIG. 5B is a block diagram of a GPC from FIG. 2, according to one embodiment of the invention.

FIG. 5B is a block diagram of a GPC 208 from FIG. 2, according to one embodiment of the invention. A first set 550 is a first set of SPMs 310 that is configured as alpha stage SPMs 310 to execute tessellation control shader programs. A second set 560 is a second set of SPMs 310 that is configured as beta stage SPMs 310 to execute tessellation evaluation shader programs. A TGA unit 510 within each SPM 310 breaks the generated geometric primitives produced from a surface into smaller batches called "tasks" for redistribution to the second set of SPMs 310. Each task may represent M vertices of (post-tesselation) generated geometric primitives and a single surface may produce multiple tasks. The tasks are sized based on the parallel processing capability and resource limitations of an SPM 310, so that each vertex is processed by one thread in a thread group.

Work distribution crossbar 330 is configured to connect each SPM 310 in first set 550 to each SPM 310 in second set 560. More specifically, a particular task may be distributed to an SPM 310 in the second set 560 that is in a different GPC 208 than the SPM 310 in the first set 550 that produced the tessellated vertices in the task. A task distribution unit (collector block) 207 receives the tasks and, in some embodiments, may be configured with assistance with other units (not shown) to reorder the tasks into the API order in which the surfaces were distributed by the work distribution unit 200 to SPMs 310 in the first set 550. More specifically, another unit locally reorders the tasks that are output be each alpha SPM 310 and the task distribution unit 207 globally reorders the per-GPC tasks output by GPCs 208 between the different GPCs 208. For example, when the work distribution unit 200 distributes the patches in a round-robin manner, the task distribution unit 207 restores the patches (now tasks) to the order before to the round-robin distribution. The pipeline manager 305 provides the task distribution unit 207 with the API order information that is used by the task distribution unit 207 to reorder the tasks and information that is sent directly from the work distribution unit 200 to the task distribution unit 207.

Surface data 555, representing the surface patches may be stored in L1 cache 320, as shown in FIG. 5B, and read by first set 550. Pipeline manager 305 may be configured to provide locations of surface data 555 to each SPM 310 in first set 550 to distribute the surface patches for processing. Tessellation data, representing the graphics primitives output by first set 550 is written to circular buffer entries (CBEs 358) in the L2 cache 350. The tessellation data is then fetched from the CBEs 358 by the SPMs 310 in the second set 560 and may be stored in L1 cache 320 as tessellation data 570.

Pipeline manager 305 provides work distribution crossbar 330 and crossbar unit 210 with routing information that is needed to distribute tasks to the inputs of SPMs 310 in second set 560. A task may be distributed to an SPM 310 in a second set 560 that is a different GPC 208 through the crossbar unit 210 and task distribution unit 207. In some embodiments of the present invention, such as the embodiment shown in FIG. 5B, tessellation data 570 is routed through work distribution crossbar 330 and crossbar unit 210 as the tessellation data 570 is written to the L2 cache 350 by SPMs 310 in the first set 550 and fetched from the L2 cache 350 and stored in the L1 cache 320 by SPMs 310 in the second set 560. In other embodiments of the present invention, indices corresponding to the location of each task that includes a set of vertices of generated graphics primitives are routed through work distribution crossbar 330 and crossbar unit 210 to distribute the tessellation data 570 output by first set 550 to the inputs of second set 560.

Importantly, tessellation data 570 is stored in L1 cache 320 and/or L2 cache 350 rather than being stored PP memory 204, reducing the number of clock cycles needed to read and write tessellation data 570. In particular, the tessellation data 570 may be stored in the L1 cache 320 when the tessellation data 570 is accessed by SPMs 310 in the first set 550 or the second set 560. The tessellation data 570 may be written to a circular buffer entry (CBE) 358 that is stored in the L2 cache 350 after processing by the first set 550 is completed and the TGA 510 has generated tasks. The tessellation data 570 may be read from the CBE 358 in the L2 cache 350 and stored in the L1 cache 320 for processing by the second set 560. In one embodiment, each SPM 310 in the first set 550 may write a single CBE 358 that includes the tessellation data generated for a single surface patch. The single CBE 358 may then be read by multiple SPMs 310 in the second set 560 to process each task that includes generated geometric primitives for the single surface patch. Note that a single task may include multiple patches.

For example, for geometry shading each task may be defined using a start and end values corresponding to particular offsets or positions within the CBE 358. For tessellation, the locations of tessellated vertices for a task may be conveyed in the tessellate version of the original surface 500. Each SPM 310 in the second set 560 reads and processes a portion of the CBE 348 based on the task-specific start and end values. When primitive instancing is used by a geometry shader program, generated primitives may be instanced by simply duplicating the generated geometric primitive in one or more tasks. The tessellation data of instanced generated geometric primitives may be read by one or more SPMs 310 in the second set 560 to produce copies of each instanced generated geometric primitive.

Figure 6A:
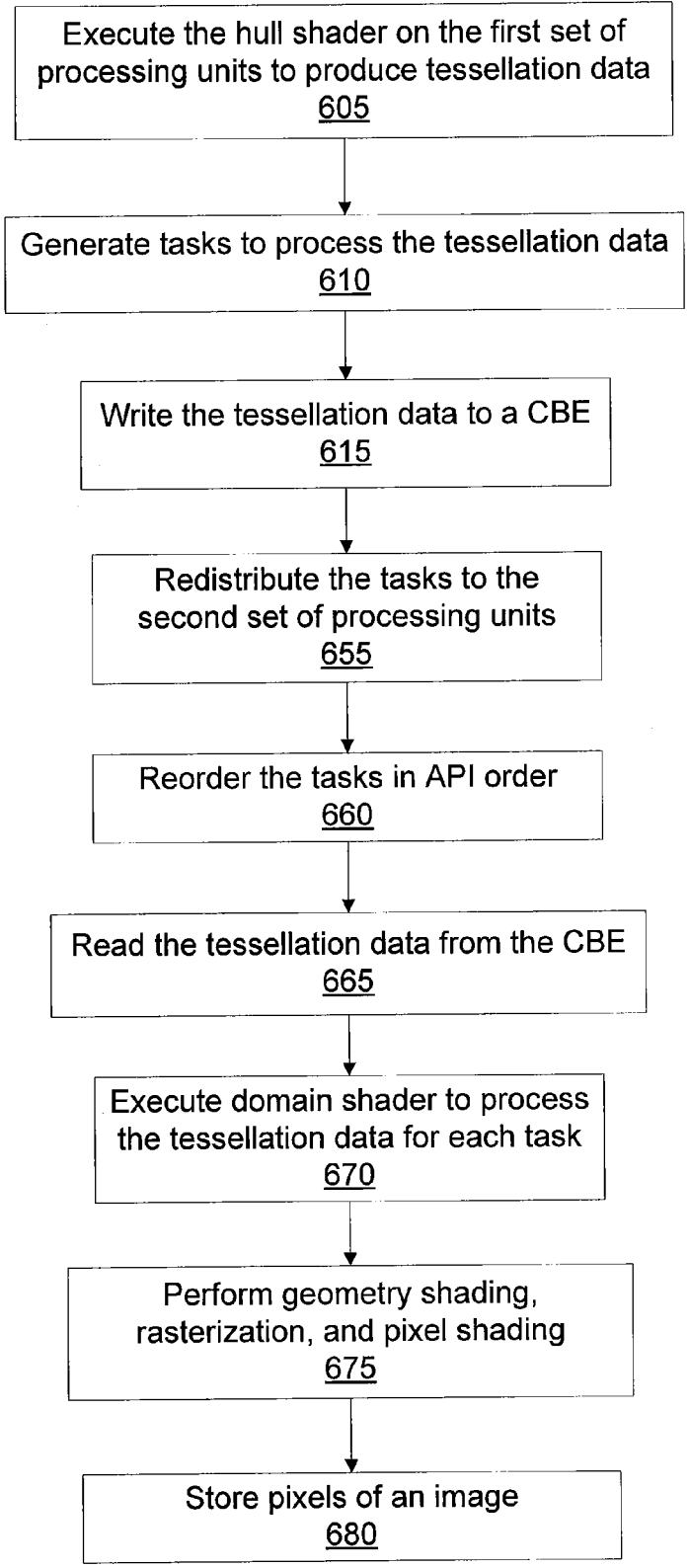
FIG. 6A is a flow diagram of method steps for redistributing the generated geometric primitives, according to one embodiment of the present invention.

FIG. 6A is a flow diagram of method steps for redistributing the generated geometric primitives, according to one embodiment of the present invention. A device driver 103 configures a first set of SPMs 310 for hull (tessellation control) shader program execution. A hull shader program may perform a change of basis of a control point, computation of tessellation LOD values, or the like, and is executed once for each surface patch. A change of basis of a patch occurs when a hull shader program inputs one patch (set of control points) and outputs a different patch (a different set of control points), where the number of control points varies between the input patch and the output patch. The device driver 103 configures a second set of SPMs 310 for domain (tessellation evaluation) shader program execution. A domain shader program may compute a final position and attributes of each tessellated vertex based on the patch primitive control points, a parametric (u,v) position for each vertex, displacement maps, and the like, and is executed once for each output vertex.

The device driver 103 configures SPMs 310 into a first set and a second set and downloads the hull shader and domain shader programs that are executed by GPCs 208 to process the surface data 555 and produce output vertices. At step 605 SPMs 310 in the first set of SPMs 310 execute the hull shader program to produce tessellation data 570, e.g., control points for generated geometric primitives such as cubic triangles.

At step 610 the TGA 510 generates tasks to process the tessellation data 570. At step 615 the tessellation data 570 is written or copied to the CBE 358. At step 655 the TGA 510 redistributes the tasks that include a portion of the tessellation data 570 for the generated geometric primitives output by the first set 550 to the second set 560. At step 660 the task distribution unit 207 in the PPU 202 globally reorders the tasks received by the SPM 310 in API order. At step 665 the SPM 310 reads or copies the tessellation data 570 from the CBE 358 in the L2 cache 350 to the L1 cache 320. At step 670 the SPMs 310 execute the domain shader program to produce output vertices. Note, that for different vertices, steps 605, 610, 615, 655, 660, 665, and 670 are completed at different times. Therefore, as the generated geometric primitives are output by SPMs 310 in the first set 550, SPMs 310 in the second set 560 begin execution of the domain shader programs to produce output vertices.

Because SPMs 310 are configured to process the surface patches in a single pass, device driver 103 is not needed to reconfigure SPMs 310 to perform different operations during the tessellation operations. When one or more SPMs 310 are redeployed from the beta stage to the alpha stage, the transition is coordinated by the pipeline manager 305 with alpha and beta SPM masks that are generated by the work distribution unit 200 and the task distribution unit 207, respectively. In particular, new Alpha work may never be assigned to an SPM 310 until all beta work before the alpha work (in API order) has been launched by the task distribution unit 207. The task distribution unit 207 then sends a Transition signal to the SPMs 310. When one or more SPMs 310 are redeployed from the alpha stage to the beta stage the pipeline manager 305 sends a transition signal to the transitioning SPMs 310 and stops sending any work to the redeployed SPMs 310. The task distribution unit 207 then starts sending Beta work to the redeployed SPMs 310.

Typically, there is at least one alpha SPM 310 and one beta SPM 310 at the same time to which all the tasks generated by alpha SPM 310 are received and processed. In a system that includes only a single SPM 310, however, there cannot be an alpha and a beta SPM 310 at the same time. So, the same SPM 310 is time multiplexed. When in alpha mode, the SPM 310 must complete processing all of the surface patches and then switch to beta mode. In beta mode, similarly the SPM 310 must be able to complete processing of all of the tasks before switching again. This means that in order to avoid a deadlock condition, the output generated in each mode must be small enough to be queued somewhere before the SPM 310 is ready to receive the output as an input to the next stage. Also, since there is some overhead incurred for SPMs 310 being redeployed, there is implicit serialization and processing throughput is reduced. In one embodiment, multiple SPMs 310 are timesliced to alternate between functioning as alpha SPMs 310 and beta SPMs 310.

Figure 6B:
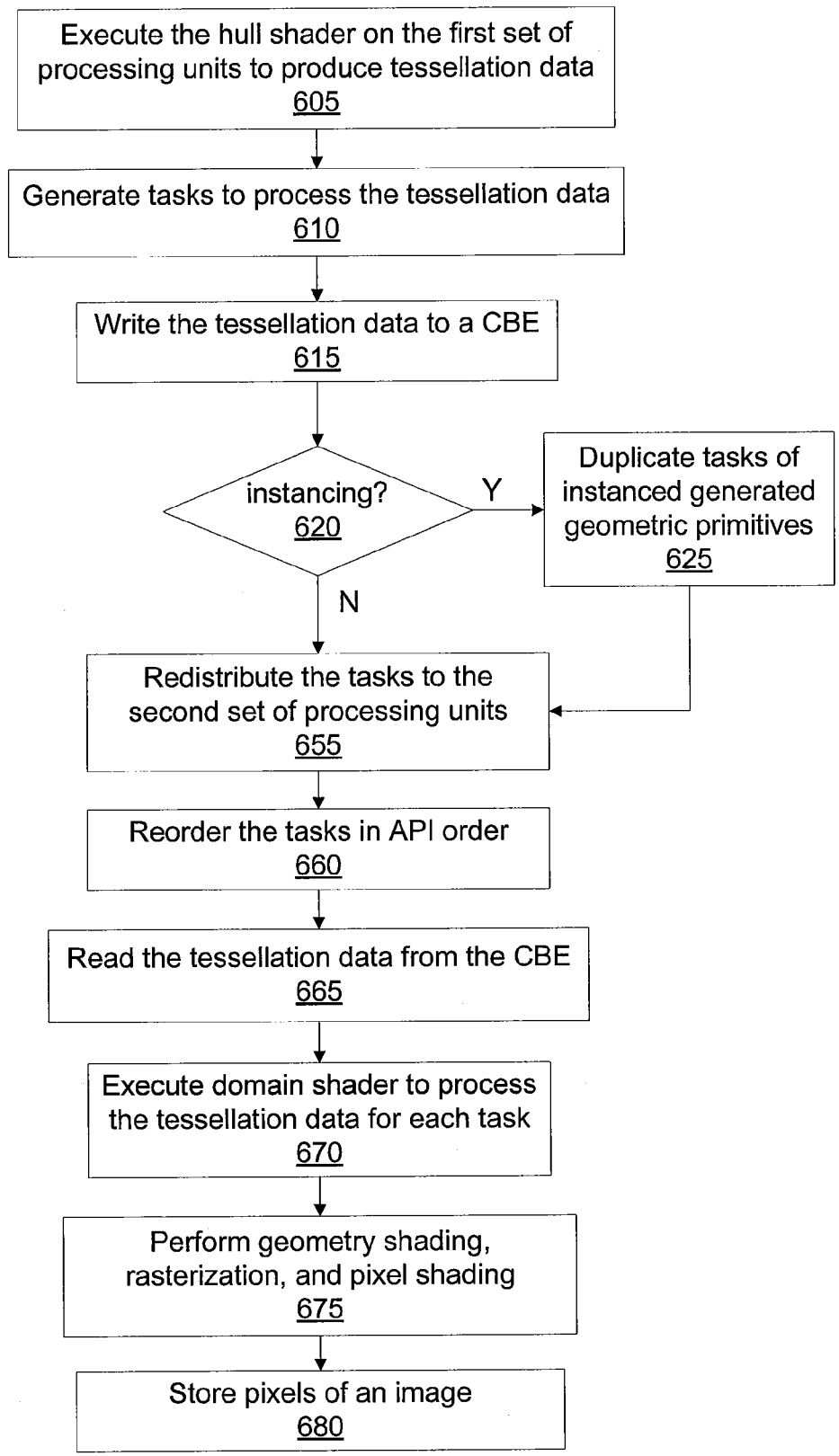
FIG. 6B is a flow diagram of method steps for redistributing the generated geometric primitives when primitive instancing is used, according to one embodiment of the present invention.

FIG. 6B is another flow diagram of method steps for redistributing the generated geometric primitives when primitive instancing is used, according to one embodiment of the present invention. Steps 605, 610, and 615 are completed as previously described. At step 620, the TGA 510 determines if instancing is enabled for one or more of the generated geometric primitives, and, if not, the TGA 510 proceeds to step 655. Otherwise, at step 625, the TGA 510 duplicates one or more tasks to produce multiple instances of one of more of the generated geometric primitives before proceeding to step 655 when the task does not fit within the resource constraints of the SPM 310. Steps 655, 660, 665, 670, 675, and 680 are completed as previously described in conjunction with FIG. 6A.

By redistributing geometric primitives generated by the tessellation shaders the per-vertex processing is balanced across multiple graphics pipelines in the SPMs 310 of the second set 560. The tessellation data produced by a single surface patch is divided into tasks that do not exceed the resource limits of an SPM 310. Therefore, the performance of the tessellation shaders is improved. Performance of the geometry shaders is improved since the processing for geometric primitive instancing is also distributed across the SPMs 310 in the second set 560.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for distributing generated geometric primitives for processing by streaming multiprocessors, the method comprising:
    executing a hull shader program by a first set of the streaming multiprocessors to process surface patches and generate tessellation data for each surface patch including tessellation level-of-detail values that define generated geometric primitives for each surface patch;
    generating tasks for processing the generated geometric primitives based on resource limitations of a streaming multiprocessor configured to execute one of the tasks and the level-of-detail values; and
    distributing the tasks to a second set of the streaming multiprocessors to process the tasks according to a domain shader program to produce processed vertices of the surface patches,
    wherein a first streaming multiprocessor included in the first set of the streaming multiprocessors is not also included in the second set of the streaming multiprocessors.

2. The method of claim 1, wherein the tessellation data is stored in a level-one cache that is written by the first set of streaming multiprocessors and read by the second set of streaming multiprocessors.

3. The method of claim 2, wherein the generating of the tasks comprises copying the tessellation data from the level-one cache to a circular buffer entry in a level-two cache.

4. The method of claim 3, wherein the distributing of the tasks comprises copying the tessellation data from the circular buffer entry in the level-two cache to the level-one cache.

5. The method of claim 1, further comprising the step of reordering the tasks into an applications programming interface order in which the surface patches were received for processing by the first set of the streaming multiprocessors after distributing the tasks.

6. The method of claim 1, wherein the generating of the tasks comprises duplicating a task to generate multiple instances of one of the generated geometric primitives.

7. The method of claim 1, wherein a task is defined by task-specific start and end values corresponding to tessellation data for a portion of one of the surface patches and each streaming multiprocessor in the second set of streaming multiprocessors processes the tessellation data for the portion of the surface patches.

8. The method of claim 1, wherein execution of the domain shader program expands a first surface patch of the surface patches into more generated geometric primitives for the first surface patch as the tessellation level-of-detail values increases.

9. The method of claim 1, further comprising determining, based on processing workload, which streaming multiprocessors belong in the first set of the streaming multiprocessor and which streaming multiprocessors belong in the second set of the streaming multiprocessors.

10. The method of claim 1, wherein no streaming multiprocessor included in the first set of the streaming multiprocessors is included in the second set of the streaming multiprocessors, and no streaming multiprocessor included in the second set of the streaming multiprocessors is included in the first set of the streaming multiprocessors.

11. The method of claim 1, wherein the first streaming multiprocessor is configured to produce work that is distributed to more than one streaming multiprocessor included in the second set of the streaming multiprocessors.

12. The method of claim 1, wherein:
    a second streaming multiprocessor is included in the second set of the streaming multiprocessors but is not included in the first set of the streaming multiprocessors, and
    the first streaming multiprocessor is configured to execute the hull shader program when the second streaming multiprocessor executes the domain shader program.

13. A non-transitory computer-readable storage medium storing instructions that, when executed by a processor, distribute generated geometric primitives for processing by streaming multiprocessors, by performing the steps of:
    executing a hull shader program by a first set of the streaming multiprocessors to process surface patches and generate tessellation data for each surface patch including tessellation level-of-detail values that define generated geometric primitives for each surface patch;
    generating tasks for processing the generated geometric primitives based on resource limitations of a streaming multiprocessor configured to execute one of the tasks and the level-of-detail values; and
    distributing the tasks to a second set of the streaming multiprocessors to process the tasks according to a domain shader program to produce processed vertices of the surface patches,
    wherein a first streaming multiprocessor included in the first set of the streaming multiprocessors is not also included in the second set of the streaming multiprocessors.

14. The non-transitory computer-readable storage medium of claim 13, further comprising the step of reordering the tasks into an applications programming interface order in which the surface patches were received for processing by the first set of the streaming multiprocessors after distributing the tasks.

15. The non-transitory computer-readable storage medium of claim 14, wherein the generating of the tasks comprises duplicating a task to generate multiple instances of one of the generated geometric primitives.

16. The non-transitory computer-readable storage medium of claim 15, wherein each streaming multiprocessor in the second set of streaming multiprocessors reads a portion of the tessellation data for one of the surface patches based on task-specific start and end values.

17. A system for distributing generated geometric primitives for processing by streaming multiprocessors, comprising:
   a graphics processor including:
      a first set of streaming multiprocessors that are configured to:
         execute a hull shader program to process surface patches and generate tessellation data for each surface patch including tessellation level-of-detail values that define generated geometric primitives for each surface patch; and
         generate tasks for processing the generated geometric primitives based on resource limitations of a streaming multiprocessor configured to execute one of the tasks and the level-of-detail values; and
      a second set of the streaming multiprocessors that are coupled to the first set of streaming multiprocessors through a crossbar interconnect and configured to process the tasks according to a domain shader program to produce processed vertices of the surface patches,
   wherein a first streaming multiprocessor included in the first set of the streaming multiprocessors is not also included in the second set of the streaming multiprocessors.

18. The system of claim 17, further comprising a level-one cache configured to store the tessellation data that is written by the first set of streaming multiprocessors and read by the second set of streaming multiprocessors.

19. The system of claim 18, wherein the first set of streaming multiprocessors is further configured to copy the tessellation data from the level-one cache to a circular buffer entry in a level-two cache.

20. The system of claim 19, wherein the second set of streaming multiprocessors is further configured to copy the tessellation data from the circular buffer entry in the level-two cache to the level-one cache.

21. The system of claim 17, wherein the second set of streaming multiprocessors is configured to reordering the tasks into an applications programming interface order in which the surface patches were received for processing by the first set of the streaming multiprocessors.

22. The system of claim 17, wherein the first set of streaming multiprocessors is further configured to duplicate a task to generate multiple instances of one of the generated geometric primitives.

23. The system of claim 17, a task is defined by task-specific start and end values corresponding to tessellation data for a portion of one of the surface patches and each streaming multiprocessor in the second set of streaming multiprocessors processes the tessellation data for the portion of the surface patches.

24. The system of claim 17, wherein execution of the domain shader program expands a first surface patch of the surface patches into more generated geometric primitives for the first surface patch as the tessellation level-of-detail values increases.

* * * * *